(12) United States Patent
Matsuhisa

(10) Patent No.: US 8,783,125 B2
(45) Date of Patent: Jul. 22, 2014

(54) SLIDE PLATE AND RACK GUIDE OF RACK AND PINION TYPE STEERING DEVICE

(75) Inventor: Hiroichi Matsuhisa, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 940 days.

(21) Appl. No.: 12/325,970

(22) Filed: Dec. 1, 2008

(65) Prior Publication Data

US 2009/0139366 A1 Jun. 4, 2009

(30) Foreign Application Priority Data

Nov. 30, 2007 (JP) ................. 2007-310719

(51) Int. Cl.
*F16H 35/00* (2006.01)
*F16H 1/04* (2006.01)

(52) U.S. Cl.
USPC ....................... 74/388 PS; 74/422

(58) Field of Classification Search
USPC ............. 74/388 PS, 422, 89.12, 89.11, 89.17, 74/89.18, 498; 180/428, 422, 400; 280/93.514, 93.515, 67; 384/37, 119
See application file for complete search history.

(56) References Cited

U.S. PATENT DOCUMENTS

| | | | | |
|---|---|---|---|---|
| 4,263,817 A | * | 4/1981 | Taig | 74/422 |
| 4,800,770 A | * | 1/1989 | Kobayashi et al. | 74/422 |
| 5,022,279 A | * | 6/1991 | Ueno et al. | 74/422 |
| 5,746,285 A | * | 5/1998 | Yonezawa | 74/422 |
| 5,906,138 A | * | 5/1999 | Kostrzewa | 74/422 |
| 5,937,703 A | * | 8/1999 | Engler | 74/498 |
| 6,142,031 A | * | 11/2000 | Phillips | 74/422 |
| 6,178,843 B1 | * | 1/2001 | Machida et al. | 74/498 |
| 7,815,204 B2 | * | 10/2010 | Kaida et al. | 280/93.514 |
| 2002/0124670 A1 | * | 9/2002 | Bugosh | 74/388 PS |
| 2005/0034391 A1 | * | 2/2005 | Leek | 52/223.1 |
| 2005/0041895 A1 | * | 2/2005 | Pionnier et al. | 384/42 |
| 2006/0185460 A1 | * | 8/2006 | Shiino et al. | 74/422 |
| 2007/0163375 A1 | * | 7/2007 | Counts | 74/422 |
| 2007/0228682 A1 | * | 10/2007 | Yamamoto et al. | 280/93.514 |

FOREIGN PATENT DOCUMENTS

JP 2001347956 A * 12/2001
JP 2002-002506 1/2002

* cited by examiner

*Primary Examiner* — Daniel Yabut
(74) *Attorney, Agent, or Firm* — Browdy and Neimark, PLLC

(57) ABSTRACT

A slide plate and a rack guide for supporting a rack bar in a casing of a rack and pinion type steering device are provided. The slide plate can be mounted on a rack guide base body while being restricted to be in a regular state with respect to a recessed portion of the rack guide base body. The rack guide is constituted by the slide plate and the rack guide base body on which the slide plate is mounted. The slide plate is constituted by a main body portion receiving the rack bar, and restricting portions on both sides of the main body portion in a moving direction of the rack bar, which restricting portions are in contact with both flanks of the rack guide base body.

8 Claims, 6 Drawing Sheets

SLIDE PLATE AND RACK GUIDE OF RACK AND PINION TYPE STEERING DEVICE

RELATED APPLICATION

The present application claims priority to Japan Application No. 2007-310719 filed on Nov. 30, 2007, the entirety of which is incorporated herein by reference.

BACKGROUND OF THE INVENTION

1. Field of the Invention

The present invention relates to a slide plate and a rack guide that receive a rack bar of a rack and pinion type steering device, and particularly to a configuration for attaching the slide plate to a rack guide base body of the rack guide.

2. Description of Related Art

Conventionally, a rack and pinion type steering device is constituted to include a pinion which is rotated by a steering wheel, and a rack bar having rack teeth which mesh with the pinion so as to convert the rotation of the pinion into linear movement of the rack bar.

The pinion of the rack and pinion type steering device is rotatably supported by a casing via a bearing, and an outer peripheral surface of the rack bar having a circular arc shape on an opposite side to a rack tooth formed side is supported by a rack guide in the casing. The rack guide consists of a rack guide base body with a recessed portion of a circular arc shape formed at an end portion, and a slide plate of a curved shape formed so that its inner surface corresponds to the outer surface of the circular arc shape of the rack teeth of the rack bar, and is constituted by mounting the slide plate on the recessed portion of the rack guide base body. By coating the surface of the slide plate to be in contact with the rack bar with a material with a low friction coefficient such as polytetrafluoroethylene (PTFE), slidability of the rack bar is enhanced.

In order to fix the slide plate to the rack guide base body, JP-A-2002-2506 adopts a configuration in which a fitting hole portion is formed in a center of the recessed portion of the rack guide base body, a fitting projected portion which is fitted into the fitting hole portion is formed on the slide plate, and the fitting projected portion is press-fitted into the fitting hole portion, for example.

The fitting projected portion provided on the slide plate is formed by drawing, and therefore, is generally formed into a cylindrical shape. However, in the method in which the slide plate having the cylindrical fitting projected portion formed thereon is fitted into the fitting hole portion of the rack guide base body, the fitting projected portion is allowed to be press-fitted into the fitting hole portion even if a center line of curvature of the circular arc along the curved surface of the slide plate (hereinafter, simply called the center line in the axial direction of the slide plate) is inclined with respect to a center line of curvature of the recessed portion of the rack guide base body (hereinafter, simply called the center line in the axial direction of the recessed portion). If the slide plate is mounted in a state where the center line in the axial direction of the slide plate is inclined with respect to the center line in the axial direction of the recessed portion, that is, in a state where the slide plate is shifted in the rotational direction about the fitting projected portion from a regular state with respect to the rack guide base body, a gap is generated between the slide plate and the inner surface of the recessed portion of the rack guide base body, and there is the fear that the rack bar locally contacts the slide plate to cause abnormal wear.

BRIEF SUMMARY OF THE INVENTION

The present invention is made in view of the above described circumstances, and an object of the present invention is to provide a slide plate and a rack guide of a rack and pinion type steering device in which the slide plate can be mounted while being restricted so as to be in a regular state with respect to a recessed portion of a rack guide base body when the slide plate is mounted on the rack guide base body.

In order to attain the above-described object, the present invention is characterized in that a slide plate which is mounted on a rack guide base body is configured to include a main body portion for receiving a rack bar, and restricting portions on both sides of the main body portion in a moving direction of the rack bar, which restricting portion are adapted to be in contact with sides of the rack guide base body.

By the above configuration, even if the center line in the axial direction of the slide plate is in a state where it inclines with respect to the center line in the axial direction of the recessed portion when the slide plate is mounted on the recessed portion formed at the end portion of the rack guide base body, since both restricting portions of the slide plate are in contact with both flanks of the rack guide base body, the center line in the axial direction of the slide plate is automatically corrected so as to correspond to the center line in the axial direction of the recessed portion. Thus, the direction of the center line in the axial direction of the slide plate can be caused to correspond to the direction of the center line in the axial direction of the recessed portion of the rack guide base body, and accordingly, the slide plate can be mounted so as to be in the regular state with respect to the recessed portion of the rack guide base body.

In the above-described slide plate, the main body portion can be formed into a curved shape, and the restricting portions can be made bent pieces on both sides of the main body portion in the moving direction of the rack bar, which bent pieces are formed by being bent toward the sides of the rack guide base body so as to be in contact with both flanks of the rack guide base body.

The restricting portions on both sides of the main body portion in the moving direction of the rack bar can be located to be parallel with each other. An angle formed by each of the restricting portions and the main body portion is preferably set at 90 degrees or less.

Further, it is possible to adopt a configuration in which the angle formed by each of the restricting portions and the main portion is set at less than 90 degrees, and tip end portions of both restricting portions are in contact with both flanks of the rack guide base body.

The above configuration brings about a state where only the tip end portions of the restricting portions are in contact with the flanks of the rack guide base body. Therefore, as compared with the case of making the entire surfaces of the restricting portions be in contact with the flanks of the rack guide base body, the dimension control for making the restricting portions on both sides be in contact with both flanks of the rack guide is facilitated.

It is possible to provide a gusset in a corner portion between the main body portion and each of the restricting portions of the slide plate, which gusset appears as a groove portion becoming gradually shallower toward the main body portion side from the restricting portion side on an outer side on the rack bar side, and appears as a projected portion which projects in a form connecting the restricting portion and the main body portion on an inner side on the rack guide base body side.

By this configuration, the gusset increases strength of the corner portion and prevents deformation of each of the restricting portions. Further, by formation of the gusset, the groove portion which becomes gradually shallower toward the main body portion side from the restricting portion side is formed on the outer side on the rack bar side. Therefore, when the rack bar moves, grease existing inside the casing can be led in between the rack bar and the slide plate from the groove portion, so that lubricity of the rack bar and the slide plate can be enhanced.

A plurality of above described gussets can be formed in a circular arc direction of the main body portion.

By forming a plurality of gussets as above, the effect of preventing deformation of the restricting portion and the effect of leading the grease are more improved for each of the restricting portions.

When the main body portion of the slide plate is formed into a curved shape, the recessed portion which is formed in the end portion of the rack guide base body can be formed into a circular arc shape.

In the present invention, it is possible to form engaging groove portions in a guide base body on which the slide plate with the above described gussets formed therein is mounted, so that the engaging groove portions engage with the projected portions of the gussets on both sides of the recessed portion formed in the end portion in the moving direction of the rack bar.

By the above configuration, the projected portions of the gussets and the engaging groove portions of the rack guide base body are engaged with each other, so that when the slide plate is mounted on the recessed portion, positioning of the slide plate and the rack guide base body can be facilitated. Further, even if a force acts on the slide plate so as to shift it in the circular arc direction of the rack guide base body after the slide plate is mounted on the rack guide base body, the projected portions of the gussets are caught in the engaging groove portions of the rack guide base body, and therefore, the slide plate can be prevented from being displaced in the circular arc direction of the rack guide base body as much as possible.

In the present invention, engaging recessed portions in which the restricting portions are fitted can be formed at both flanks of the rack guide base body.

By the above configuration, when the slide plate is mounted on the rack guide base body, positioning of the slide plate and the rack guide base body can be facilitated by fitting the restricting portions along the engaging recessed portions of the rack guide base body. Further, even if a force acts on the slide plate so as to shift it in the circular arc direction of the rack guide base body after the slide plate is mounted on the rack guide base body, the restricting portions are caught in the engaging recessed portions, and therefore, the slide plate can be prevented from being displaced in the circular arc direction of the rack guide base body as much as possible.

DETAILED DESCRIPTION OF THE INVENTION

Hereinafter, a first embodiment of the present invention will be described based on FIGS. 1 to 10.

Figure 2:
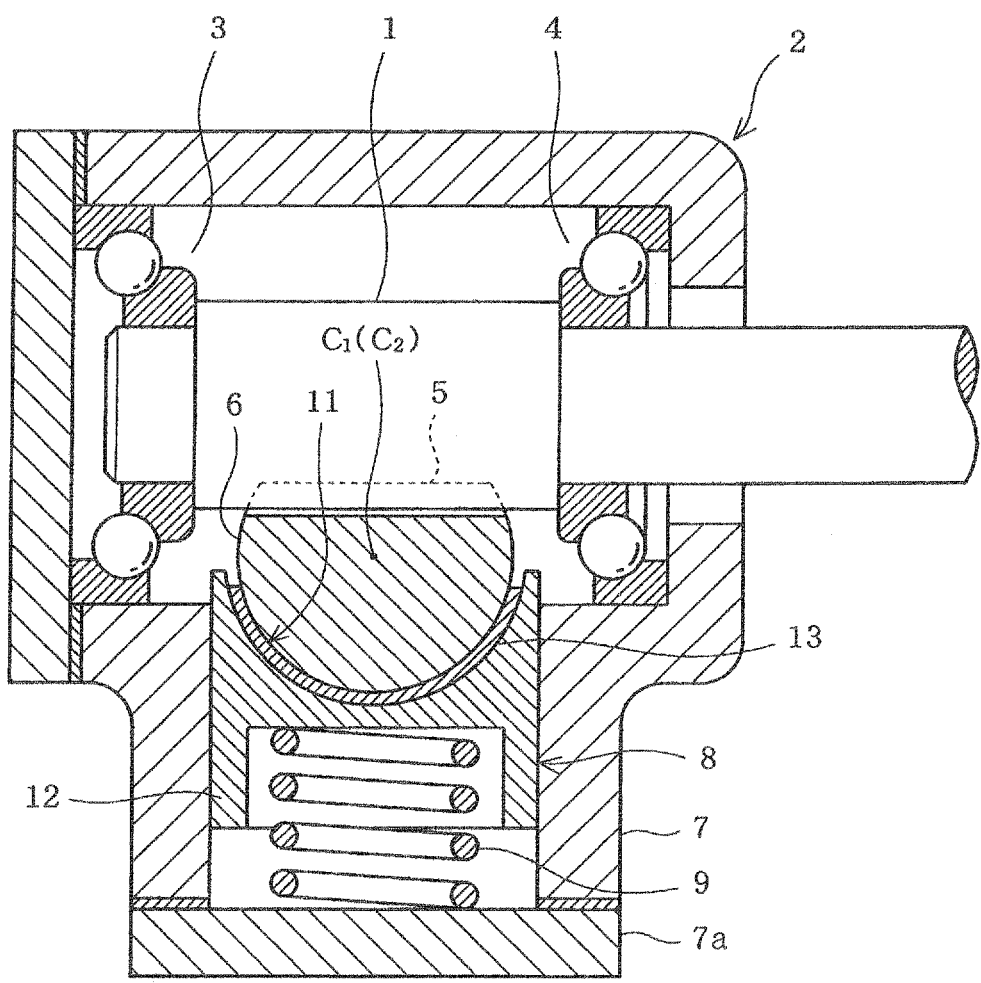
FIG. 2 is a sectional view of a rack and pinion type steering device.

FIG. 2 shows an entire configuration of a rack and pinion type steering device that converts rotation of a pinion rotated by a steering wheel into linear movement of a rack bar. In FIG. 2, the pinion 1 is inserted into a casing 2 of a steering device, and is rotatably supported in the casing 2 by bearings 3 and 4. In the casing 2, grease (not illustrated) is filled, and a rack bar 6 that has rack teeth 5 meshed with the pinion 1 is placed. Both ends of the rack bar 6 are projected outward from the casing 2.

A cylindrical projected portion 7 is integrally formed in the casing 2. The projected portion 7 is formed at such a position as to place the rack bar 6 between the projected portion 7 and the pinion 1, and a rack guide 8 which slidably supports the rack bar 6 is placed inside the projected portion 7 so as to be slidable in the vertical direction in FIG. 2. The rack guide 8 is urged to the rack bar 6 side by a compression coil spring 9 as an elastic member which is placed between the rack guide 8 and a bottom surface portion 7a disposed on a bottom side of the projected portion 7.

The above described rack guide 8 is constituted by a slide plate (slide receiving plate) 11 of a curved shape which receives and supports the rack bar 6, and a rack guide base body 12 on which the slide plate 11 is mounted.

Figure 3:
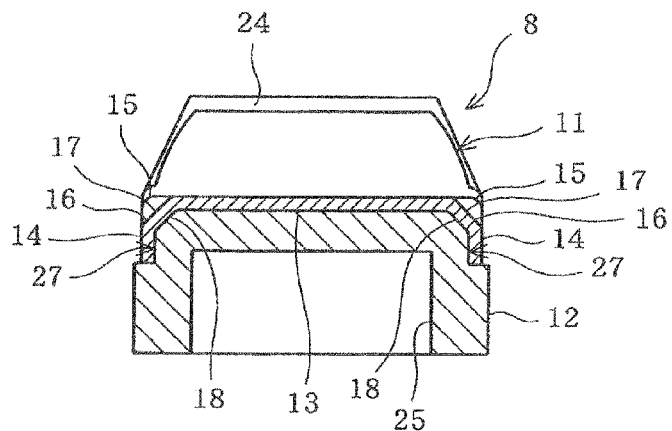
FIG. 3 is a sectional view taken along line A-A in FIG. 1.
Figure 4:
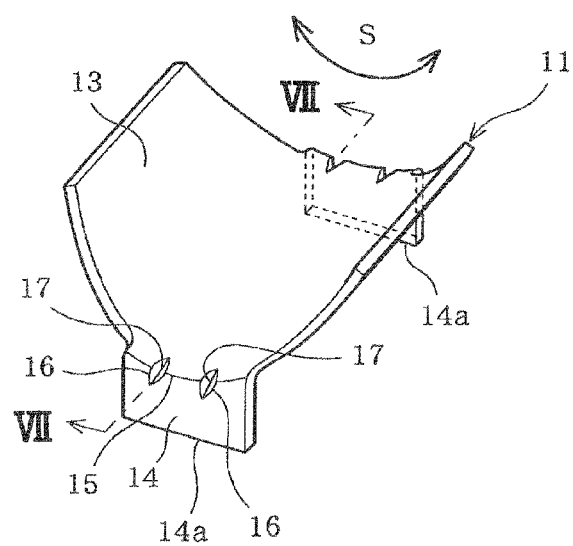
FIG. 4 is a perspective view of a slide plate.
Figure 7:
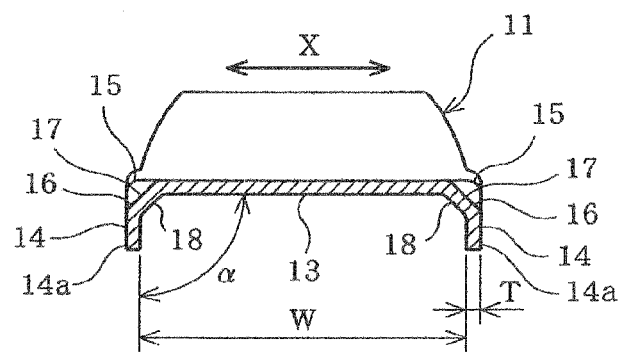
FIG. 7 is a sectional view taken along line B-B in FIG. 4.
Figure 8:
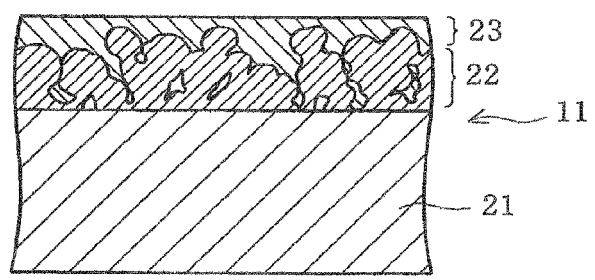
FIG. 8 is a partially sectional view of a slide plate.

The slide plate 11 is constituted by a main body portion 13 of a curved shape which receives the rack bar 6, and restricting portions 14 and 14 which are in the form of bent pieces which are in contact with both flanks 26a of the rack guide base body 12 by being bent toward the rack guide base body 12 side, on both sides of the main body portion 13 in a moving direction of the rack bar 6 (the direction of arrow X in FIGS. 1 and 7), as shown in FIGS. 1 to 7. Both restricting portions 14 and 14 are located to be parallel with each other as shown in FIG. 7. For example, the restricting portion 14 is bent so that an angle a formed with the main body portion 13 becomes 90 degrees. As shown in FIG. 4, the restricting portion 14 forms a plane shape.

At each of corner portions 15 between the main body portion 13 and the restricting portions 14 on both sides in the moving direction of the rack bar 6, a plurality of gussets, for example, two gussets 16 are formed along a circular arc direction of the main body portion 13 (the direction of arrows S in FIG. 4). Each of the gussets 16 appears as a groove portion 17, which becomes gradually shallower toward the main body portion 13 side from the restricting portion 14 side, on an outer side on the rack bar 6 side as shown in FIG. 3, and appears as a projected portion 18 which is projected in such a form as to connect the restricting portion 14 and the main body portion 13, on an inner side on the rack guide base body 12 side.

The slide plate 11 has a three layer structure of a back metal 21, an intermediate layer 22 provided on a surface of the back metal 21, and a resin layer 23 which is located on an upper side of the intermediate layer 22 in the drawing. Here, the intermediate layer 22 is mainly constituted by a sintered alloy and is impregnated with a resin of the resin layer 23.

The back metal 21 is constituted by, for example, a steel plate, and the sintered alloy of the intermediate layer 22 is constituted by copper metal powder. The resin layer 23 includes 1 to 20 volume % of lead fluoride, and 1 to 30 volume % of a lead and tin alloy including 3 to 30 volume % of tin, and is constituted by 2 to 35 volume % of the total of the above described lead fluoride and lead and tin alloy, and the remaining part substantially made of a mixture with polytetrafluoroethylene, and has self-lubricity.

The slide plate 11 is produced by in sequence: stamping a plate shaped multi-layer material having a three-layer structure of the back metal 21, the intermediate layer 22 and the resin layer 23 into a predetermined shape by a press; bending it to form the main body portion 13; and performing working of bending the restricting portions 14 and forming the gussets 16.

Figure 1:
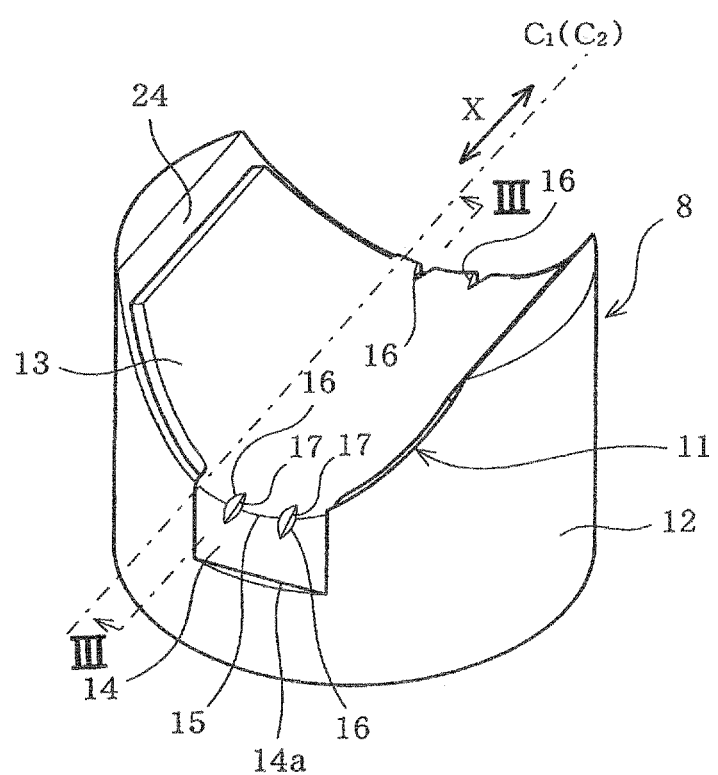
FIG. 1 is a perspective view showing a rack guide in a first embodiment of the present invention.
Figure 9:
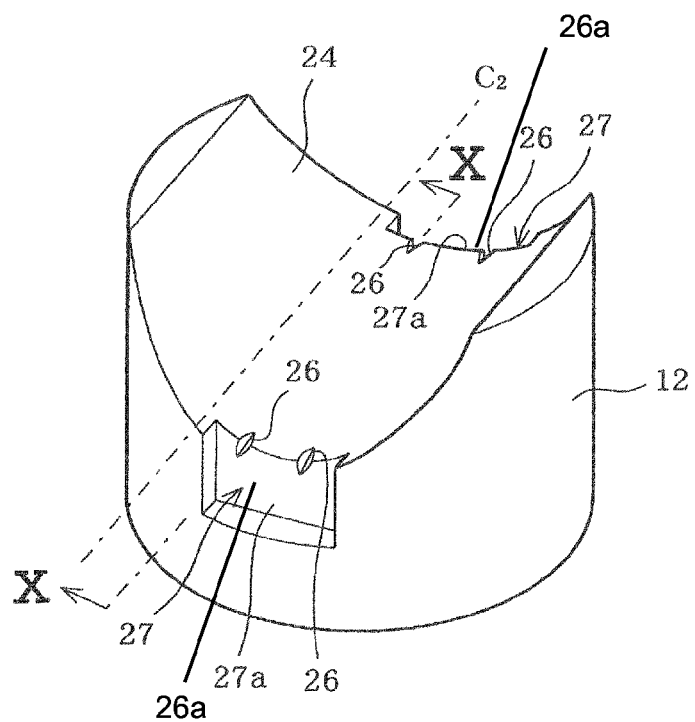
FIG. 9 is a perspective view of a rack guide base body.
Figure 10:
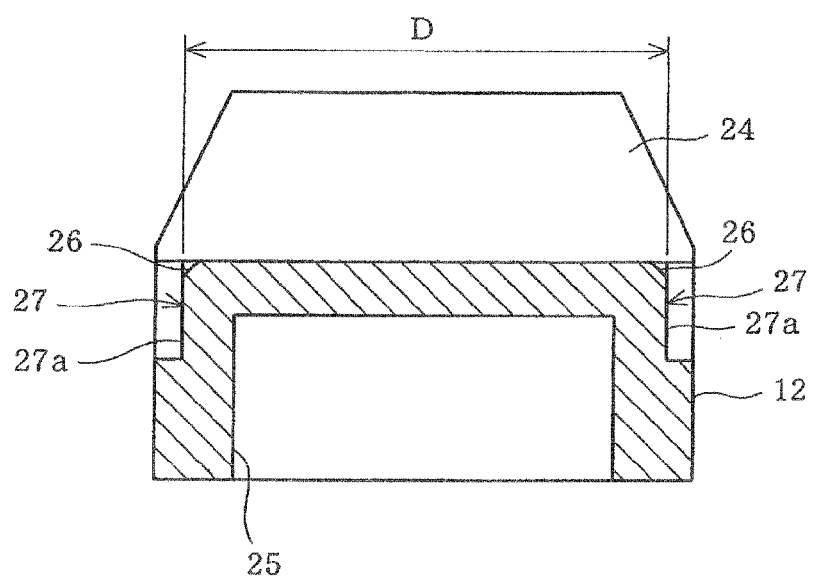
FIG. 10 is a sectional view taken along line C-C in FIG. 9.

The rack guide base body 12 is constituted by an aluminum alloy for example, and is formed into a circular column shape for example, and a recessed portion 24 forming substantially the same curved shape (circular arc shape) as the slide plate 11 is formed in one end portion (an upper end portion in FIG. 9) of the circular column shape as shown in FIGS. 1, 9 and 10. In a lower part of the rack guide base body 12, a cylindrical hollow portion 25 is formed for housing the aforementioned compression coil spring 9 as shown in FIGS. 2, 3 and 10. As shown in FIG. 9, engaging groove portions 26 corresponding to the projected portions 18 of the gussets 16 of the slide plate 11 are formed on both sides of the recessed portion 24 of the rack guide base body 12 in the moving direction of the rack bar 6. Further, engaging recessed portions 27 which engage with the restricting portions 14 are formed on both flanks 26a located on both sides of the rack guide base body 12 in the moving direction of the rack bar 6. The engaging recessed portion 27 is formed to have substantially the same size as the restricting portion 14, and allows the restricting portion 14 to be fitted therein. An inner surface 27a in a depth direction of the engaging recessed portion 27 is formed into a plane shape, so that a back surface of the restricting portion 14 (the surface on the side where the restricting portions 14 face each other) is in plane-contact with the inner surface 27a.

Here, the total dimension D between the inner surfaces 27a and 27a of the engaging recessed portions 27 and 27 on both flanks of the rack guide base body 12 shown in FIG. 10 is set to be the same as or slightly larger than the distance W between both restricting portions 14 and 14 of the slide plate 11 shown in FIG. 7, and is constituted to achieve so-called "interference fit".

In order to mount the slide plate 11 as above on the recessed portion 24 of the rack guide base body 12, both restricting portions 14 and 14 of the slide plate 11 are fitted along both engaging recessed portions 27 and 27 of the rack guide base body 12, and the main body portion 13 of the slide plate 11 is put into the recessed portion 24 of the rack guide base body 12. At this time, even if a center line $C_1$ of curvature of the circular arc along the curved surface of the slide plate 11 (hereinafter, simply called the center line $C_1$ in an axial direction of the slide plate 11) is in an inclined state with respect to a center line $C_2$ of curvature of the recessed portion 24 (hereinafter, simply called the center line $C_2$ in an axial direction of the recessed portion 24), both restricting portions 14 and 14 of the slide plate 11 are in contact with both flanks 26a (engaging recessed portions 27 and 27) of the rack guide base body 12, so that the slide plate 11 is automatically corrected so as to make its center line $C_1$ in the axial direction correspond to the center line $C_2$ in the axial direction of the recessed portion 24.

Accordingly, the direction of the center line $C_1$ in the axial direction of the slide plate 11 can be caused to correspond to the direction of the center line $C_2$ in the axial direction of the recessed portion 24 of the rack guide base body 12, and the slide plate 11 can be mounted in the regular state with respect to the rack guide base body 12. Further, the engaging recessed portions 27 of the rack guide base body 12 operate as guides for fitting the slide plate 11, and positioning of the slide plate 11 and the rack guide base body 12 is facilitated.

Subsequently, the rack guide 8 is disposed in a predetermined position in the casing 2 of the steering device, and is assembled so as to support an outer peripheral surface having a circular arc shape of the rack bar 6 slidably on the resin layer 23 which is an inner surface layer of the main body portion 13. When the pinion 1 rotates, the rack bar 6 linearly moves in a direction (the direction of arrow X) of the center line $C_1$ in the axial direction of the slide plate 11.

When the rack bar 6 moves, grease filled in the casing 2 adheres to the rack bar 6 and is led in between the rack bar 6 and the main body portion 13 of the slide plate 11, and functions to enhance lubricity between both members. In this case, since the groove portions 17 of the gussets 16 are present on both sides of the main body portion 13, and the groove portions 17 become shallower toward the main body portion 13 side from the restricting portions 14 side on the outer side on the rack bar 6 side, the grease is easily led in between the rack bar 6 and the main body portion 13 through the groove portions 17, and lubricity of the rack bar 6 and the slide plate 11 is enhanced. In the present embodiment, a plurality of (four) gussets 16 are provided in the circular arc direction of the main body portion 13. Therefore, the grease spreads more uniformly over the entire area in the circular arc direction of the main body portion 13, and the effect of leading the grease is more improved. Further, by providing the gussets 16 in the corner portions 15 of the slide plate 11, the strength of the corner portions 15 is increased, and deformation of the restricting portions 14 is prevented. In addition, by the engagement of the projected portions 18 of the gussets 16 and the engaging groove portions 26 of the rack guide base body 12, positioning of the slide plate 11 and the rack guide base body 12 is facilitated when mounting the slide plate 11 on the recessed portion 24.

Even when the force which displaces the slide plate 11 in the circular arc direction (circular arc direction of the main body portion 13 (the direction of arrow S)) of the recessed portion 24 of the rack guide base body 12 acts on the slide plate 11, the projected portions 18 of the gussets 16 are caught in the engaging groove portions 26 of the rack guide base body 12, and the restricting portions 14 are caught in the engaging recessed portions 27, so that the slide plate 11 is prevented from displacing in the circular arc direction of the rack guide base body 12. Of course, since the restricting portions 14 are in the state where those are in contact with the inner surfaces 27a in the depth direction of the engaging recessed portions 27, the center line $C_1$ in the axial direction of the slide plate 11 does not incline with respect to the center line $C_2$ in the axial direction of the recessed portion 24 of the rack guide base body 12, and abnormal wear can be prevented. By preventing abnormal wear, occurrence of abnormal noise can be prevented.

Figure 5:
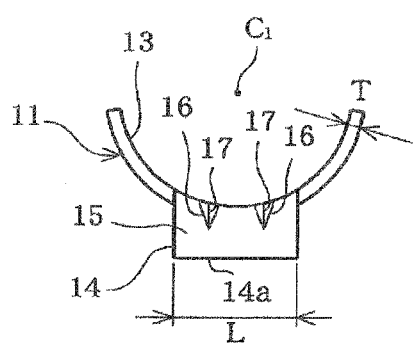
FIG. 5 is a front view of the slide plate.
Figure 6:
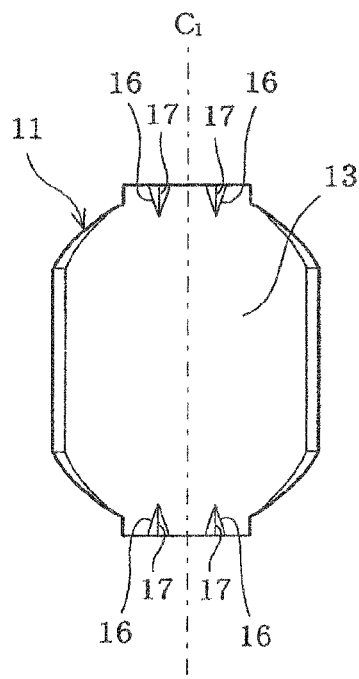
FIG. 6 is a plane view of the slide plate.

Here, when the rack bar 6 linearly moves, a shearing force occurs in the restricting portions 14 which are bent from the main body portion 13 of the slide plate 11. Accordingly, the restricting portions 14 need to be designed to endure the shearing force. Specifically, a thickness dimension T of the main body portion 13 (restricting portion 14) and a length dimension L in the circular arc direction of the restricting portion 14, which are shown in FIGS. 5 and 7, need to be set in consideration of yield stress a of the back metal 21 and a force F in the moving direction of the rack bar 6. Here, the force F in the moving direction of the rack bar 6 is a frictional force, and is obtained by the product of a maximum load $W_1$ occurring between the rack bar 6 and the slide plate 11 and a maximum friction coefficient μ of the rack bar 6 and the slide plate 11.

In order not to shear and fracture the restricting portions 14 even if the force F in the moving direction of the rack bar 6 occurs, the sectional area (thickness dimension T×length dimension L) of the restricting portion 14 is preferably set to be not less than the value obtained by dividing the frictional force F (maximum load $W_1$×maximum friction coefficient μ) between the slide plate 11 and the rack bar 6 by the yield stress σ of the back metal 21. Here, the thickness dimension T is uniquely determined by the thickness dimension particularly of the back metal 21 of the multi-layer material of three layers. Accordingly, the length dimension L needs to be practically set at a value corresponding to the frictional force F, and the length dimension L needs to be not less than (maximum load $W_1$×maximum friction coefficient μ)÷(thickness dimension T×yield stress σ). For example, when the maximum load $W_1$ is 6000 (N), the maximum friction coefficient μ is 0.2, the thickness dimension T is 0.7 (mm), and the yield stress a of the back metal 21 is 200 (N/mm$^2$), the length dimension L is set at about 8.6 (mm) or larger. In the present embodiment, the restricting portion 14 is preferably formed into the shape which satisfies L≥12 T in the relationship of the thickness dimension T and the length dimension L.

Figure 11:
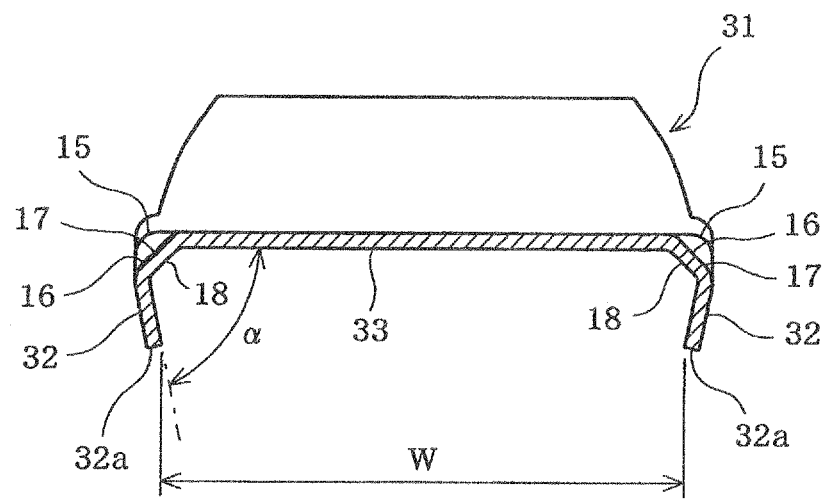
FIG. 11 is a view corresponding to FIG. 7 showing a second embodiment of the present invention.
Figure 12:
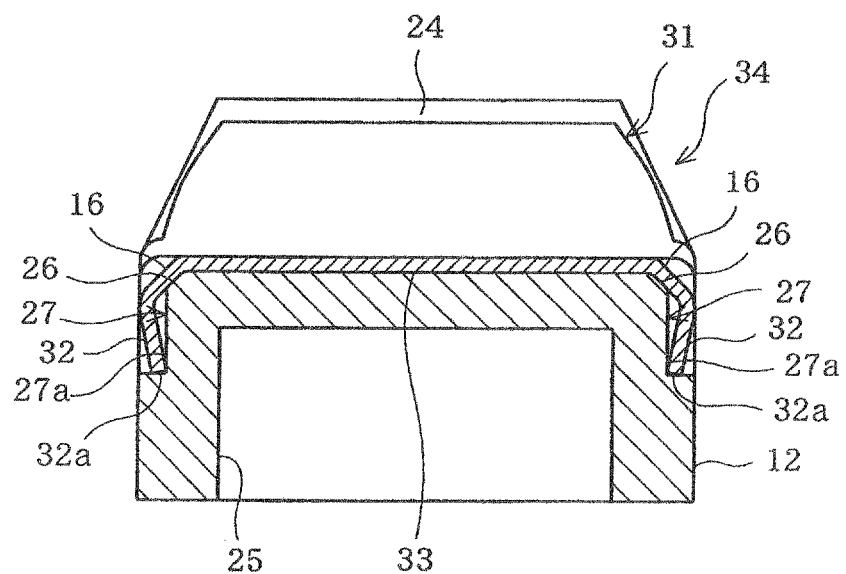
FIG. 12 is a view corresponding to FIG. 3.

Next, a second embodiment of the present invention will be described with reference to FIGS. 11 and 12. The same parts as in the above described first embodiment are assigned with the same reference numerals and characters, and the detailed description of those will be omitted.

The point in which the embodiment differs from the above described first embodiment is the bent angle a of the restricting portion of the slide plate. Specifically, in a slide plate 31 of the second embodiment shown in FIG. 11, a restricting portion 32 is bent so that the angle α formed by the restricting portion 32 and a main body portion 33 becomes less than 90 degrees. The distance dimension W between tip end portions 32a and 32a of both restricting portions 32 and 32 is set to be the same as the distance dimension W (see FIG. 7) between the tip end portions 14a and 14a of both restricting portions 14 and 14 shown in the above described first embodiment. FIG. 12 shows a rack guide 34 constituted by mounting the slide plate 31 on the rack guide base body 12, and in the slide plate 31, the tip end portions 32a and 32a of the restricting portions 32 and 32 are in contact with the inner surfaces 27a and 27a in the depth directions of the engaging recessed portions 27 and 27 at both flanks 26a of the rack guide base body 12.

According to the present embodiment constituted in this manner, the restricting portion 32 is in contact with the inner surface 27a of the engaging recessed portion 27 only at its tip end portion 32a, and therefore, the distance dimension between both the restricting portions 32 and 32 can be easily produced to become the distance dimension W, and dimensional control is facilitated.

It should be noted that the present invention is not limited to the embodiments described above and shown in the drawings, and the following expansions or modifications are possible.

The slide plate may be bent so that the angle α formed by the restricting portion and the main body portion becomes less than 90 degrees, and the distance dimension W between the restricting portions located to be opposed at the sides in the moving direction of the rack bar may be set to be smaller than the dimension D of the upper end portion of the rack guide on the side in the moving direction of the rack bar. When the slide plate of this configuration is mounted on the rack guide base body, the rack guide base body is more firmly sandwiched with the entire surfaces of the restricting portions by a restoring force of the restricting portions located to be opposed to each other on the sides in the moving direction of the rack bar.

The engaging recessed portions do not have to be formed in the rack guide base body. In this case, the restricting portion is formed into a circular arc surface shape along the flank of the circular shape of the rack guide base body.

The inner surface in the depth direction of the engaging recessed portion of the rack guide base body may be formed into a circular arc surface shape. In this case, the restricting portion may be formed into a circular arc surface shape which engages with the inner surface in the depth direction of the engaging recessed portion of the rack guide base body.

As long as the slide plate can be mounted while being restricted to be in the regular state with respect to the recessed portion of the rack guide base body, the slide plate may have the main body portion and the restricting portion which consist of an integrated item, or separate items. Further, the slide plate and the rack guide base body are preferably fixed by elastic deformation in the restricting portions and both flanks of the rack guide base body, but may not have to be fixed in such a manner. The slide plate having the restricting portions and the rack guide base body may be bonded to each other by bonding, calking or the like.

The dimensions, materials and the like of the above described components may be properly changed.

The invention claimed is:

1. A rack guide for receiving and supporting a rack bar of a rack and pinion type steering device which converts rotation of a pinion rotated by a steering wheel into linear movement of the rack bar, the rack guide being provided within a casing of the rack and pinion type steering device, comprising:
   a slide plate having a main body portion for receiving and supporting the rack bar; and
   a rack guide base body having a recessed portion formed in an end portion thereof for receiving the slide plate, and a flank formed on each of two sides of the recessed portion in a moving direction of the rack bar, each flank having a surface extending in a direction perpendicular to the moving direction of the rack bar,
   wherein the slide plate comprises:
   restricting portions extending at an angle from the main body portion and each restricting portion being provided on opposite sides of the main body portion with respect to the moving direction of the rack bar to be configured to be in direct contact with the surfaces of the flanks and a corner between each restricting portion and the main body portion; and
   a gusset defined in the corner between the main body portion and each of the restricting portions, each gusset comprising a groove extending through the corner and having a first portion defined in the restricting portion and a second portion defined in the main body portion, the groove becoming gradually shallower toward the main body portion side from the restricting portions side on an outer side on the rack bar side, and a projected portion coextending with the groove of each gusset and which projects on an inner side on the rack guide base body side, and wherein the rack guide base body comprising engaging grooves defined on opposite sides of the recessed portion with respect to the moving direction of the rack bar such that each groove extends through a corner between the rack guide base body and the respective flank, and each groove has a first portion defined in the recessed portion and a second portion defined in the respective flanks, whereby the slide plate is mounted on the recessed portion of the rack guide base body so that both restricting portions are in direct contact with the respective flanks of the rack guide base body, and the projected portions of the gussets directly engage in the engaging grooves.

2. The rack guide according to claim 1, wherein the main body portion is integral with the restricting portions.

3. The rack guide according to claim 2, wherein
the main body portion has a curved shape, and
the restricting portions comprise bent pieces bent toward the rack guide base body on the opposite sides of the main body portion with respect to the moving direction of the rack bar.

4. The rack guide according to claim 2, wherein the angle formed by each respective restricting portion and the main body portion is less than 90 degrees, and tip end portions of the restricting portions are in contact with the respected flanks of the rack guide base body.

5. The rack guide according to claim 1, wherein a plurality of the gussets are defined in a circular arc direction of the main body portion.

6. The rack guide according to claim 1, wherein engaging recessed portions in which the restricting portions are fitted are defined in both flanks of the rack guide base body, and the restricting portions are in contact with inner surfaces of the engaging recessed portions.

7. The rack guide according to claim 1, wherein each of the restricting portions of the slide plate is configured to satisfy the formula: $L \geq 12T$, where L is a length of the restricting portion in a circular arc direction, and T is a thickness of the restricting portion.

8. The slide plate according to claim 1, wherein each gusset is shorter than an entire surface of the slide plate in the moving direction of the rack bar.

* * * * *